(12) United States Patent
Mukherjee et al.

(10) Patent No.: US 11,221,674 B2
(45) Date of Patent: Jan. 11, 2022

(54) HAPTIC OUTPUT FOR TRACKPAD CONTROLLED USING FORCE SIGNAL AND SENSE SIGNAL

(71) Applicant: GOOGLE LLC, Mountain View, CA (US)

(72) Inventors: Debanjan Mukherjee, San Jose, CA (US); Jianxun Wang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/733,494

(22) PCT Filed: Jan. 7, 2019

(86) PCT No.: PCT/US2019/012462
§ 371 (c)(1),
(2) Date: Aug. 11, 2020

(87) PCT Pub. No.: WO2020/145934
PCT Pub. Date: Jul. 16, 2020

(65) Prior Publication Data
US 2021/0081045 A1    Mar. 18, 2021

(51) Int. Cl.
*G06F 3/01*    (2006.01)
*G06F 3/041*   (2006.01)

(52) U.S. Cl.
CPC ............ *G06F 3/016* (2013.01); *G06F 3/0414* (2013.01); *G06F 3/0418* (2013.01)

(58) Field of Classification Search
CPC ........... G05B 2219/40553; G06F 3/016; G06F 3/04886; B60W 50/16; F15B 13/14; H01H 13/85
See application file for complete search history.

(56) References Cited

U.S. PATENT DOCUMENTS 9,665,206 B1 *   5/2017  Missig ................. G06F 3/0441
2005/0201362 A1  9/2005  Klein et al.
(Continued)

FOREIGN PATENT DOCUMENTS

WO    2013169299 A1   11/2013

OTHER PUBLICATIONS

International Search Report and Written Opinion for Application No. PCT/US2019/012462, dated Aug. 13, 2019, 9 pages.
(Continued)

*Primary Examiner* — William Lu
(74) *Attorney, Agent, or Firm* — Brake Hughes Bellermann LLP

(57) ABSTRACT

A method includes: receiving, in an electronic device having a trackpad, a force signal that a force sensor of the trackpad generates based on a user input at the trackpad; receiving, in the electronic device, a touch signal that a touch sensor of the trackpad generates based on the user input; selecting, by the electronic device and based on at least one of the force signal or the touch signal, a first driver signal waveform from among multiple driver signal waveforms applicable to an actuator coupled to the trackpad; scaling, by the electronic device, the first driver signal waveform into a second driver signal waveform, the scaling based on at least one of the force signal or the touch signal; and generating, by the electronic device, a haptic output in response to the user input by providing the second driver signal waveform to the actuator.

21 Claims, 10 Drawing Sheets

(56) References Cited

U.S. PATENT DOCUMENTS

| | | | |
|---|---|---|---|
| 2007/0121914 A1 | 5/2007 | Pearson et al. | |
| 2010/0027854 A1* | 2/2010 | Chatterjee | G06F 3/0485 382/124 |
| 2011/0141052 A1* | 6/2011 | Bernstein | G06F 1/1692 345/174 |
| 2012/0013569 A1* | 1/2012 | Swedin | G06F 3/0412 345/174 |
| 2012/0286944 A1* | 11/2012 | Forutanpour | G06F 3/016 340/407.1 |
| 2015/0149899 A1* | 5/2015 | Bernstein | G06F 3/016 715/702 |
| 2015/0378495 A1* | 12/2015 | Losh | G06F 3/0446 345/174 |
| 2016/0062537 A1* | 3/2016 | Kim | G06F 3/0445 345/174 |
| 2017/0177207 A1* | 6/2017 | Ahmed | G06F 3/04886 |
| 2017/0285848 A1* | 10/2017 | Rosenberg | G06F 3/04146 |

OTHER PUBLICATIONS

International Preliminary Report on Patentability for PCT Application No. PCT/US2019/012462, dated Jul. 22, 2021, 8 pages.

\* cited by examiner

HAPTIC OUTPUT FOR TRACKPAD CONTROLLED USING FORCE SIGNAL AND SENSE SIGNAL

CROSS REFERENCE TO RELATED APPLICATION

This application is a 35 U.S.C. § 371 National Phase Entry Application from PCT/US2019/012462, filed Jan. 7, 2019, designating the U.S. the disclosure of which is incorporated herein by reference in its entirety.

TECHNICAL FIELD

This document relates, generally, to haptic output for a trackpad controlled using a force signal and a sense signal

BACKGROUND

Some electronic devices are designed to provide haptic feedback to the user based on some condition or circumstance, such as that the user activates an input device or that a predefined event occurs in a computer system. The haptic feedback can be implemented in form of one or more electric motors mounted on or inside the electronic device so as to generate physical motion (e.g., in form of vibrations) that is perceptible to the user. However, such approaches may not provide sufficient adaptiveness and this may affect the user experience. For example, from a user perception perspective, an existing approach may not provide a unified experience to customers under different circumstances.

SUMMARY

In a first aspect, a method includes: receiving, in an electronic device having a trackpad, a force signal that a force sensor of the trackpad generates based on a user input at the trackpad; receiving, in the electronic device, a touch signal that a touch sensor of the trackpad generates based on the user input; selecting, by the electronic device and based on at least one of the force signal or the touch signal, a first driver signal waveform from among multiple driver signal waveforms applicable to an actuator coupled to the trackpad; scaling, by the electronic device, the first driver signal waveform into a second driver signal waveform, the scaling based on at least one of the force signal or the touch signal; and generating, by the electronic device, a haptic output in response to the user input by providing the second driver signal waveform to the actuator.

Implementations can include any or all of the following features. Scaling the first driver signal waveform comprises at least one of altering an amplitude of the first driver signal waveform and/or altering a duration of the first driver signal waveform. The selection, scaling, and generation of the haptic output are conditioned on determining that the force signal meets a force threshold. The touch signal reflects a location of the user input on the trackpad and wherein the scaling depends on the location. The touch signal reflects a size of an area of the touchpad involved in the user input. The method further includes comparing the size of the area with a baseline area size, wherein the scaling is based at least in part on the comparison. The scaling increases with diminishing size of the area, and wherein the scaling decreases with increasing size of the area. The increase and decrease are of at least an amplitude of the first driver signal waveform. The method further includes determining a change in the size of the area during the user input, wherein the scaling is based at least in part on the determination. The selection, scaling, and generation of the haptic output are conditioned on determining that the force signal meets a force threshold, the method further comprising determining the size of the area as the force signal meets the threshold. The touch signal reflects multiple simultaneous contacts at the trackpad. The method further includes decoupling a force represented by the force signal relative to the multiple simultaneous contacts. The size of the area corresponds to a total area of the multiple simultaneous contacts. The method further includes determining a rate of change of the size of the area using the touch signal, wherein at least one of the selection and the scaling is based at least in part on the rate of change of the size of the area. The force signal reflects a force of the user input, the method further comprising determining a rate of change of the force using the force signal, wherein at least one of the selection and the scaling is based at least in part on the rate of change of the force. The multiple driver signal waveforms are associated with respective force thresholds, and wherein selecting the first driver signal waveform comprises evaluating the force signal relative to the force thresholds in size order. The actuator is operating according to one or more axes, in particular the actuator is a multi-axis actuator or a single-axis actuator.

In a second aspect, a non-transitory storage medium has stored therein instructions that when executed by a processor cause the processor to perform operations comprising: receiving, in an electronic device having a trackpad, a force signal that a force sensor of the trackpad generates based on a user input at the trackpad; receiving, in the electronic device, a touch signal that a touch sensor of the trackpad generates based on the user input; selecting, by the electronic device and based on at least one of the force signal or the touch signal, a first driver signal waveform from among multiple driver signal waveforms applicable to an actuator coupled to the trackpad; scaling, by the electronic device, the first driver signal waveform into a second driver signal waveform, the scaling based on at least one of the force signal or the touch signal; and generating, by the electronic device, a haptic output in response to the user input by providing the second driver signal waveform to the actuator.

In a third aspect, a system includes: a processor; a memory; an enclosure; a trackpad coupled to the enclosure; an actuator coupled to the trackpad and configured to generate haptic output; a force sensor coupled to the trackpad and configured to generate a force signal based on a user input at the trackpad; a touch sensor coupled to the trackpad and configured to generate a touch signal based on the user input; and a microcontroller configured to select, based on at least one of the force signal or the touch signal, a first driver signal waveform from among multiple driver signal waveforms applicable to the actuator, scale the first driver signal waveform into a second driver signal waveform based on at least one of the force signal or the touch signal, and provide the second driver signal waveform to the actuator to generate the haptic output in response to the user input.

Implementations can include any or all of the following features. The microcontroller is further configured to determine a rate of change over time for at least one of the force signal or the sense signal. The multiple driver signal waveforms are associated with respective force thresholds, and wherein the microcontroller is further configured to evaluate the force signal relative to the force thresholds in size order.

BRIEF DESCRIPTION OF DRAWINGS

Like reference symbols in the various drawings indicate like elements.

DETAILED DESCRIPTION

This document describes examples of controlling haptic output for a trackpad using a force signal and a sense signal. In some implementations, a trackpad is designed or operated with an emphasis on the user perception perspective, and on providing a unified experience to customers also under different circumstances. For example, the haptic output may be adaptively adjusted based on the force(s) and/or gesture(s) registered by the trackpad, so as to provide a more flexible dynamic in the human-machine interface (HMI) through which the user is interacting with an electronic device Systems and techniques described herein can provide one or more advantages compared to earlier approaches. A consistency of user experience over the lifetime of a product can be provided. User configurable haptic output can be provided. Closed-loop feedback can be provided for a haptic output system. Haptic output can be configured based on a state of an actuator.

Figure 2:
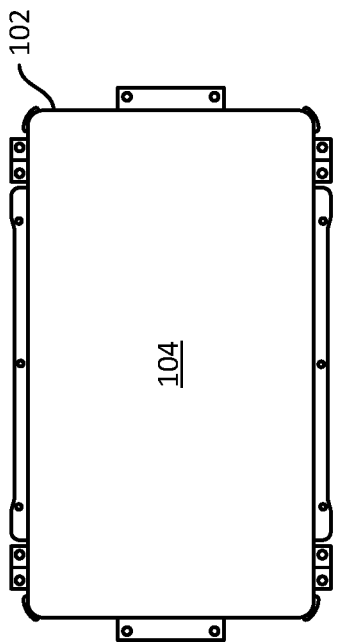
FIG. 2 shows a top view of the trackpad of FIG. 1.
Figure 3:
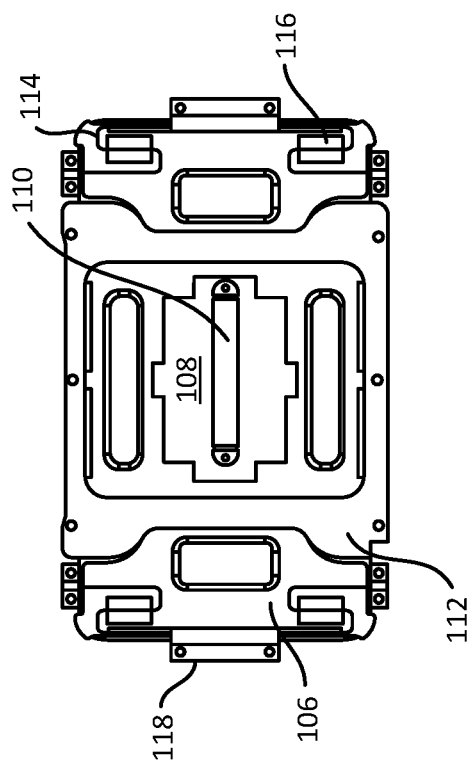
FIG. 3 shows a bottom view of the trackpad of FIG. 1.
Figure 1:
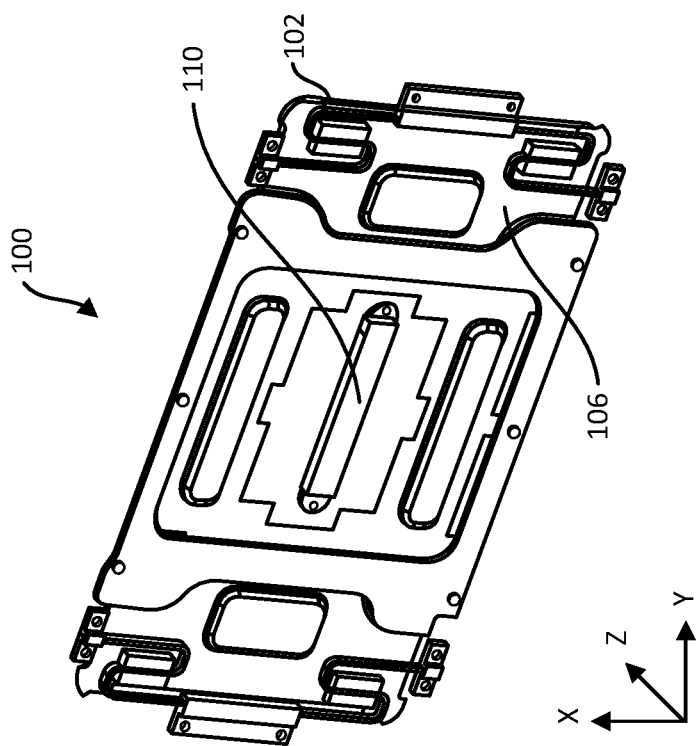
FIG. 1 shows a perspective view of an example of a trackpad for a computer system.

FIG. 1 shows a perspective view of an example of a trackpad 100 for a computer system. FIG. 2 shows a top view of the trackpad 100 of FIG. 1. FIG. 3 shows a bottom view of the trackpad 100 of FIG. 1. The trackpad 100 can be used with one or more other examples described herein.

The trackpad 100 can be used with various types of computer systems. The trackpad 100 can be used with any of multiple types of electronic devices, including, but not limited to, a laptop computer; a tablet; a smartphone; a wearable device; a screen of a laptop computer, tablet, smartphone, and/or a wearable device; and combinations thereof. For example, the trackpad 100 can be used with systems or apparatuses corresponding to the examples described with reference to FIG. 9 below.

The trackpad 100 can be used for one or more types of input to a computer system. In some implementations, the trackpad 100 can serve as a pointing device regarding a graphical user interface (e.g., as presented on a display). A user can employ the trackpad 100 to move a cursor or other on-screen tool on a presented screen to manipulate one or more items, objects, files, windows, images or other forms of computer content. For example, the user can make an input relating to object selection, object de-selection, typing, editing, deletion, value selection and/or value de-selection regarding one or more screens presented in the graphical user interface.

Inputs can be made in one or more ways using the trackpad 100. Inputs can be made by sliding an object (e.g., a fingertip or the tip of a stylus) across the trackpad 100 in a form of gesture. Inputs can be made by pressing an object onto the trackpad 100 (e.g., in what may be called a "click" maneuver) to deflect the trackpad 100 in some direction. In such situations, it can be detected that force is applied to the trackpad 100 and one or more operations can be triggered in response to detecting the force. Here, a Cartesian coordinate system having respective x-, y-, and z-axes is shown for illustrative purposes. For example, the object can be slid across the trackpad 100 in one or both of the x- or y-directions (e.g., in a plane defined by the x- and y-axes). As another example, the object pressed onto the trackpad 100 can cause a deflection of at least part of the trackpad 100 in the z-direction (e.g., a direction inward with regard to an electronic device).

The trackpad 100 can also or instead be used to provide one or more types of output from the computer system. The trackpad 100 can provide tactile sensation that is perceptible to the user, in order to communicate one or more types of feedback, for example as described in examples below.

The trackpad 100 includes a substrate 102 that can form a majority of the physical implementation of the trackpad 100. The substrate 102 can be made of any material having a sufficient stiffness considering the intended input (e.g., sliding or pressing of the object(s)) and/or considering the intended output (e.g., mechanical motion conveyed through the trackpad 100 as part of haptic output to a user). For example, the substrate 102 can be made of metal.

The trackpad 100 can include a front surface 104 on the substrate 102. The front surface 104 can face outward (e.g., toward the user) on an electronic device where the trackpad 100 is implemented. For example, when the trackpad 100 is implemented in a laptop computer that is currently being used on a desktop surface, the front surface 104 can presently be directed substantially upward). The front surface 104 can include any material that is suitable considering the intended input and/or output. For example, the front surface 104 can include glass, metal, and/or a polymer material.

The front surface 104 can provide for touch sensing as part of the exemplary input mentioned above regarding sliding an object in a gesture on the front surface 104. As such, the front surface 104 can include touch-sensitive technology. For example, capacitive and/or resistive touch sensing can be provided in the trackpad 100.

The trackpad 100 can include a rear surface 106 on the substrate 102. The rear surface 106 can face inward (e.g., away from the user) on an electronic device where the trackpad 100 is implemented. For example, when the trackpad 100 is implemented in a laptop computer that is currently being used on a desktop surface, the front surface 104 can presently be directed substantially downward). The rear surface 106 can be the location where some functional components of the trackpad 100 are installed, for example as will be described.

The trackpad 100 can include one or more components of circuitry in order to perform input and/or output operations. Here, a printed circuit board (PCB) 108 is positioned on the rear surface 106. The PCB 108 can include components or other circuitry responsible for performing one or more functions relating to the trackpad 100. For example, the PCB 108 can include a microcontroller that manages haptic output. As another example, the PCB 108 can include a driver that generates the signal(s) that trigger the generation of the haptic output.

The trackpad 100 can include one or more components configured to generate output. Haptic output is generated using the trackpad 100. In some implementations, the trackpad 100 can provide haptic output. For example, the haptic output can be provided as a feedback to a user corresponding to the performance or non-performance of one or more operations, and/or corresponding to some particular state of the computer system. Here, an actuator 110 is positioned on the trackpad 100. For example, the actuator 110 can be mounted to the rear surface 106.

The actuator 110 can operate according to one or more principles of physics to generate haptic output that is perceptible to a user. In some implementations, the actuator 110 can be an electromagnetic actuator. For example, the actuator 110 can be a linear resonant actuator (LRA) in which electromagnetic interaction between a coil and a magnet causes a certain mass (sometimes referred to as the moving mass) to gain velocity and be displaced. Reciprocal motion can be accomplished and can provide a vibrating sensation through the haptic output.

The actuator 110 can operate according to one or more axes that can be, but are not necessarily, aligned with the respective x-, y-, and z-axes of the shown coordinate system. In some implementations, the actuator 110 is a multi-axis actuator and can provide haptic output in two or more axes simultaneously or sequentially. In some implementations, the actuator 110 is a single-axis actuator.

In the past, some haptics systems have been provided with predefined open-loop driving signals. In such an approach, an actuator may be driven using substantially the same signal over the lifespan of the product where the actuator is implemented. However, the performance of an actuator may degrade over such a lifespan. For example, a mechanical structure can be subject to wear, or the product can be involved in accidents such as being dropped to the ground. In such situations, while the actuator continues to operate it may no longer deliver the same haptic output when driven by the same predefined open-loop driving signals. As such, the user's experience of the product can suffer as a result.

The trackpad 100 can include a plate 112 that can be involved in detecting a click or another force input on the trackpad 100. In some implementations, the plate 112 can serve as, or have mounted thereon, a coil that is involved in detecting deflection of the trackpad 100 as a result of applied force.

The trackpad 100 can include a spring 114 that is involved in the suspension of the substrate 102 in its operating position. In some implementations, the spring 114 facilitates the detection of force applied to the front surface 104 by way of allowing deflection of the substrate 102. For example, the spring 114 can allow the substrate 102 to be deflected in the z-direction.

One or more damping materials can be provided for the motion/deflection of the trackpad 100. In some implementations, silicone pads can be provided on the rear surface 106. For example, the silicone pads can be covered by an over-molded plastic 116.

The trackpad 100 can have one or more structures for mounting the trackpad 100 to a computer system such as an electronic device. In some implementations, the trackpad 100 has structures 118 that can facilitate assembly of the trackpad 100 to a housing or another part of such system. For example, the structure 118 can be mounted on respective opposite edges of the substrate 102.

Figure 4:
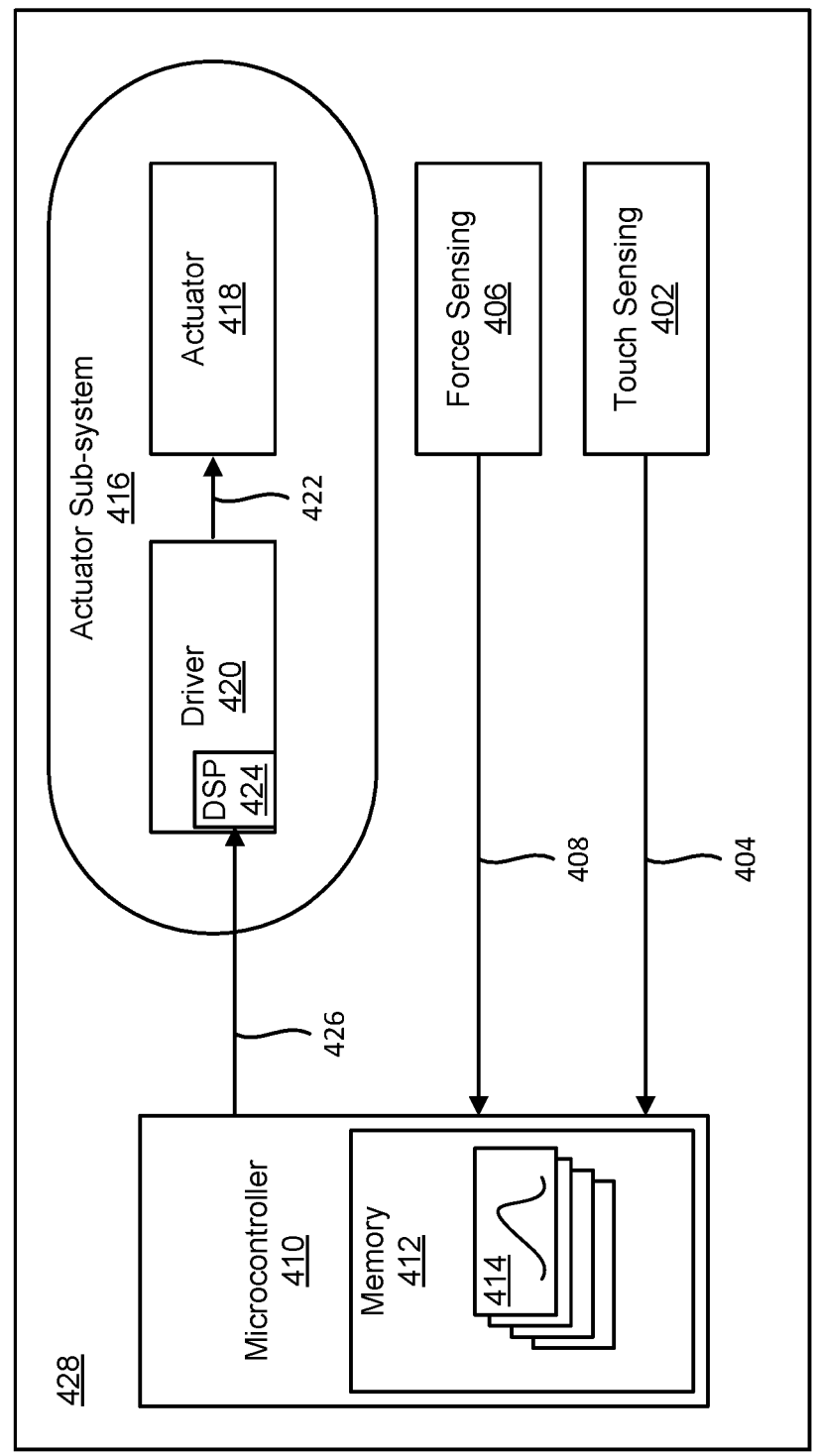
FIG. 4 schematically shows an example of a computer system that provides haptic output.

FIG. 4 schematically shows a computer system 400 that provides closed-loop feedback for haptic output. The computer system 400 can be used with one or more other examples described herein. For example, the computer system 400 can be implemented according to one or more examples described with reference to FIG. 11 below. Components of the computer system 400 can operate identically or similarly to corresponding components described in other examples herein. One or more of the components of the computer system 400 can be implemented as separate unit, or as part of an integrated unit together with at least one component.

The computer system 400 includes a touch sensing component 402. In some implementations, the touch sensing component 402 facilitates the user making inputs by either making a gesture (e.g., by sliding one or more objects along the trackpad surface) or by making at least one contact (e.g., by contacting the trackpad surface with one or more objects). For example, a gesture may be formed by the user dragging a fingertip or a stylus in contact with the trackpad surface. As another example, a contact may be formed by the user placing the fingertip or the stylus at a location on the trackpad surface. The touch sensing component 402 is coupled to one or more other aspects of the computer system 400, and such user input(s) to the touch sensing component 402 can trigger generating of at least one signal 404. For example, the signal 404 represents, or may otherwise characterize, the gesture(s) and/or contact(s) input using the touch sensing component 402.

The touch sensing component 402 may use one or more touch sensors that facilitate recognition of the gesture(s) and/or the contact(s). In some implementations, a capacitive touch sensor and/or a resistive touch sensor may be used. For example, conductive elements may be arranged in an array (e.g., a matrix), electronic circuitry may detect the change in capacitance and/or resistance relative to the array triggered by the user, and a touch signal that is reflective of the user input(s) may be generated by the electronic circuitry. One or more other types of touch sensor may be used.

The computer system 400 includes a force sensing component 406. In some implementations, the force sensing component 406 facilitates the user making input by applying force to the trackpad surface (e.g., using a finger or a stylus). For example, the user may apply force for a relatively short period of time (e.g., as a "tap" on the trackpad surface). As another example, the user may apply force for a relatively long period of time (e.g., by pressing against the trackpad surface and holding for some length of time). The force sensing component 406 is coupled to one or more other aspects of the computer system 400, and such user input(s) to the force sensing component 406 can trigger generating of at least one signal 408. For example, the signal 408 represents, or may otherwise characterize, the force input using the force sensing component 406.

The force sensing component 406 may use one or more force sensors that facilitate detection of the force(s) that the user applies to the trackpad surface. In some implementations, a capacitive force sensor and/or a strain gauge for force sensing may be used. For example, one conductive element may be arranged to be moved together with the trackpad surface and another conductive element may be arranged so as to not be moved together with the trackpad surface. Electronic circuitry may detect the change in capacitance relative to the conductive elements, and/or change in strain based on the strain gauge, triggered by the user, and a force signal that is reflective of the user input(s) may be generated by the electronic circuitry. One or more other types of force sensor may be used.

The computer system 400 includes a microcontroller 410. The microcontroller 410 includes at least: one or more processor cores, one or more memories, and one or more input/output components that allow the microcontroller 410 to communicate with other aspects of the computer system 400. In some implementations, the microcontroller 410 is implemented as part of a PCB in an electronic device. For example, the microcontroller 410 can be mounted on a trackpad that is configured for providing haptic output.

In some implementations, the microcontroller 410 can be characterized as an "always-on processor." For example, the microcontroller 410 can always be receptive to inputs using the touch sensing component 402 and/or the force sensing component 406 regardless of the state of the computer system 400 or the state of the electronic device where the computer system 400 may be implemented.

The microcontroller 410 can perform functions regarding the control and provision of haptic output. In some implementations, the microcontroller 410 can modulate the haptic output based on at least one of the signals 404 or 408 to provide an increased level of flexibility and/or customization. The microcontroller 410 may include a memory 412 (e.g., similar to the memory 1104 in FIG. 11). In some implementations, the memory 412 includes information defining driver signal waveforms 414. For example, each of the driver signal waveforms 414 may be associated with a respective force threshold (e.g., for a force detected by the force sensing component 406). In some implementations, the microcontroller 410 may select one of the driver signal waveforms 414, scale the selected driver signal waveform 414, and generate haptic output using the scaled driver signal waveform 414. The driver signal waveforms may be defined in any suitable way, including, but not limited to, in form of values corresponding to voltage and/or current levels as a function of time.

The computer system 400 includes an actuator sub-system 416 that includes an actuator 418 and a driver 420 coupled to the actuator 418. The actuator sub-system 416 can be coupled to the microcontroller 410 (e.g., by one or more bus connections) and can be configured for providing haptic output. The actuator 418 is coupled to a trackpad (see, e.g., trackpad 100 in FIGS. 1-3) and can be configured to undergo mechanical motion that impacts the trackpad so as to be perceptible to a user. In some implementations, the actuator 418 is an electromagnetic actuator. For example, the actuator 418 can be a linear resonant actuator. The actuator 418 operates based on at least one trackpad driver signal 422 that the driver 420 provides to the actuator 418. The trackpad driver signal 422 includes one or more electromagnetic waveforms (e.g., any of the driver signal waveforms 414) that cause current(s) to flow through, and voltage(s) to be applied across, the actuator 418. The driver 420 can include one or more circuits and/or other components to control the actuator 418. The microcontroller 410 can trigger the driver 420 to perform operations. The microcontroller 410 can be configured to trigger the driver 420 to generate the trackpad driver signal 422 and to provide the trackpad driver signal 422 to the actuator 418.

The operation of the driver 420 can be facilitated by at least one digital signal processor (DSP) 424. The DSP 424 for the driver 420 can be mounted on the trackpad. For example, the DSP 424 can be implemented as part of the PCB 108 (FIG. 1). The DSP 424 can be coupled to the microcontroller 410, for example by a bus connection. The DSP 424 can instruct the driver 420 as to the trackpad driver signal 422 that is to be generated, and the driver 420 executes that instruction by controlling the operation of the actuator 418 in accordance with the trackpad driver signal 422.

The microcontroller 410 can use the signal 404 from the touch sensing component 402, and/or the signal 408 from the force sensing component 406, in providing haptic output. The microcontroller 410 can generate a signal 426 to the actuator sub-system 416. In some implementations, the signal 426 provides one of the driver signal waveforms 414 to the DSP 424 of the driver 420. For example, the microcontroller 410 may scale a selected one of the driver signal waveforms 414 and provide the scaled driver signal waveform by way of the signal 426.

The computer system 400 may be implemented fully or partially inside at least one enclosure. Here, an enclosure 428 is schematically shown that envelopes the components of the computer system 400 for illustrative purposes. In some implementations, the enclosure 428 provides an exterior surface that can expose at least a trackpad surface (e.g., the front surface 104 in FIG. 2) to a user. For example, the enclosure 428 can be a laptop enclosure. As another example, the enclosure 428 can be a tablet enclosure.

The computer system 400 illustrates performance of a method comprising: receiving, in an electronic device having a trackpad (e.g., the trackpad 100 in FIG. 1), a force signal (e.g., the signal 408) that a force sensor (e.g., of the force sensing component 406) of the trackpad generates based on a user input at the trackpad; receiving, in the electronic device, a touch signal (e.g., the signal 404) that a touch sensor (e.g., of the touch sensing component 402) of the trackpad generates based on the user input; selecting, by the electronic device and based on at least one of the force signal or the touch signal, a first driver signal waveform from among multiple driver signal waveforms (e.g., the driver signal waveforms 414) applicable to an actuator (e.g., the actuator 418) coupled to the trackpad; scaling, by the electronic device, the first driver signal waveform into a second driver signal waveform (e.g., the signal 426), the scaling based on at least one of the force signal or the touch signal; and generating, by the electronic device, a haptic output (e.g., by the actuator sub-system 416) in response to the user input by providing the second driver signal waveform to the actuator.

One or more methods may be performed using examples described with reference to FIG. 11. For example, a non-transitory storage medium (e.g., the memory 1104 and/or memory 1164 in FIG. 11) may have stored therein instructions that when executed by a processor (e.g., the processor 1102 and/or processor 1152 in FIG. 11) cause the processor to perform operations.

The computer system 400 illustrates a system comprising: a processor (e.g., the processor 1102 and/or processor 1152 in FIG. 11); a memory (e.g., the memory 1104 and/or memory 1164 in FIG. 11); an enclosure (e.g., the enclosure 428); a trackpad (e.g., the trackpad 100 in FIG. 1) coupled to the enclosure; an actuator (e.g., the actuator 418) coupled to the trackpad and configured to generate haptic output; a force sensor (e.g., of the force sensing component 406) coupled to the trackpad and configured to generate a force signal (e.g., the signal 408) based on a user input at the trackpad; a touch sensor (e.g., of the touch sensing component 402) coupled to the trackpad and configured to generate a touch signal (e.g., the signal 404) based on the user input; and a microcontroller (e.g., the microcontroller 410) configured to select, based on at least one of the force signal or the touch signal, a first driver signal waveform from among multiple driver signal waveforms (e.g., the driver signal waveforms 414) applicable to the actuator, scale the first driver signal waveform into a second driver signal waveform (e.g., the signal 426) based on at least one of the force signal or the touch signal, and provide the second driver signal waveform to the actuator to generate the haptic output in response to the user input.

Figure 5:
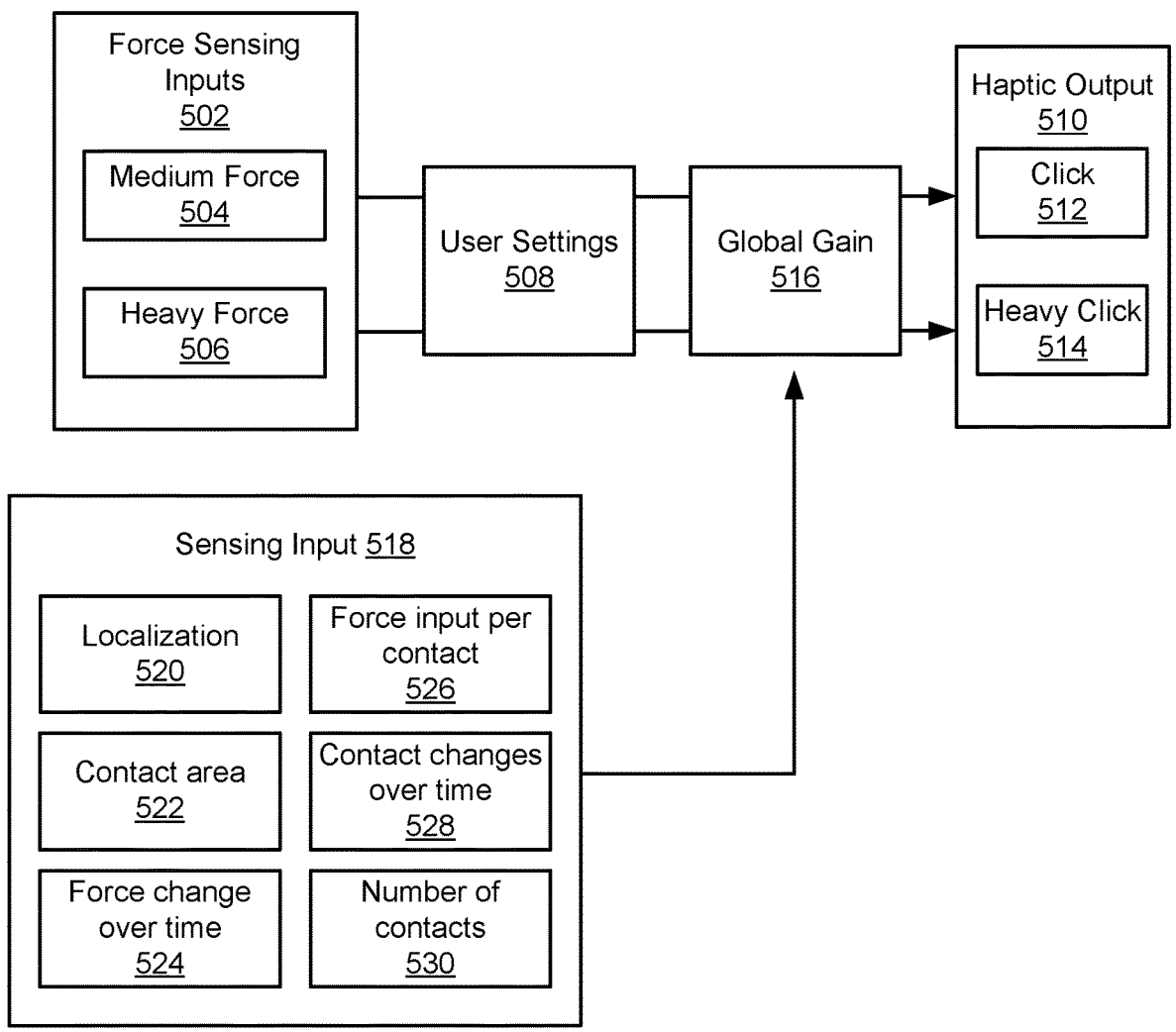
FIG. 5 schematically shows another example of a computer system that provides haptic output.

FIG. 5 schematically shows another example of a computer system 500 that provides haptic output. The computer system 500 can be used with one or more other examples described herein. For example, the computer system 500 can be implemented according to one or more examples described with reference to FIG. 11 below. Components of the computer system 500 can operate identically or similarly to corresponding components described in other examples herein. One or more of the components of the computer system 400 can be implemented as separate unit, or as part of an integrated unit together with at least one component.

The computer system 500 includes a component 502 that provides force-sensing inputs. In some implementations, the inputs are sensed using the force sensing component 406 (FIG. 4). For example, the user generates the input using the trackpad 100 in FIG. 1. Here, a medium force input 504 and a heavy force input 506 are schematically represented as being sensed by the component 502.

The computer system 500 includes user settings 508. In some implementations, the user settings 508 allow a user to customize, tailor or otherwise adapt or modify one or more aspects of how force and/or touch sensing is performed (e.g., within the computer system 400 in FIG. 4). For example, the user may define at least one parameter regarding haptic output, such as described elsewhere herein.

The computer system 500 includes a haptic output component 510. In some implementations, the haptic output component may include the actuator sub-system 416 in FIG. 4, or vice versa. For example, the haptic output component may facilitate provision of at least one driver signal waveform to the actuator 418 in FIG. 4 to generate haptic output. Here, a haptic output 512 corresponding to a click, and a haptic output 514 corresponding to a heavy click, are schematically illustrated as being generated by the haptic output component 510. For example, the haptic output 512 may be generated in response to the medium force input 504. As another example, the haptic output 514 may be generated in response to the heavy force input 506.

The computer system 500 includes a global gain component 516. The global gain component 516 may be positioned between the user settings 508 and the haptic output component 510. In some implementations, the global gain component 516 may serve to adjust, modify, alter, and/or configure one or more aspects of haptic output before it is generated.

The computer system 500 includes a sensing input component 518. The sensing input component 518 may relate to the touch and/or the force that a user applies in making an input on a trackpad. In some implementations, the sensing input component 518 may include the touch sensing component 402 and/or the force sensing component 406 in FIG. 4, or vice versa. For example, the user input of one or more touches (e.g., in form of a gesture and/or one or more contacts) may be made at the front surface 104 in FIG. 2. The sensing input component 518 may be coupled to the global gain component 516.

The sensing input component 518 may recognize, and the global gain component 516 may be responsive to, a localization 520. In some implementations, the localization 520 may correspond to one or more locations on a trackpad involved in generating a user input. For example, the global gain component 516 may adapt the haptic output differently depending on the location(s).

The sensing input component 518 may recognize, and the global gain component 516 may be responsive to, a contact area 522. In some implementations, the contact area 522 may represent a measure of the amount or size of one or more areas involved in generating a user input. For example, the global gain component 516 may adapt the haptic output differently depending on the area(s).

The sensing input component 518 may recognize, and the global gain component 516 may be responsive to, a force change over time 524. In some implementations, the force change over time 524 may represent a derivative of a force parameter with respect to time. For example, the global gain component 516 may adapt the haptic output differently depending on how the force changes during the time that the user input is made.

The sensing input component 518 may recognize, and the global gain component 516 may be responsive to, a force input per contact 526. In some implementations, the force input per contact 526 may represent a decoupling of the detected force based on multiple points of contact with a trackpad surface. For example, the global gain component 516 may adapt the haptic output differently depending on the distribution of force between two or more contact locations.

The sensing input component 518 may recognize, and the global gain component 516 may be responsive to, a contact change over time 528. In some implementations, the contact change over time 528 may represent a derivative of an area parameter with respect to time. For example, the global gain component 516 may adapt the haptic output differently depending on how the size of the contact area changes during the time that the user input is made.

The sensing input component 518 may recognize, and the global gain component 516 may be responsive to, a number of contacts 530. In some implementations, the number of contacts 530 may represent how many (e.g., one or more) distinct locations on a trackpad surface are involved in generating the user input. For example, the global gain component 516 may adapt the haptic output differently depending on whether there is only one, or two or more, contact points.

Figure 6:
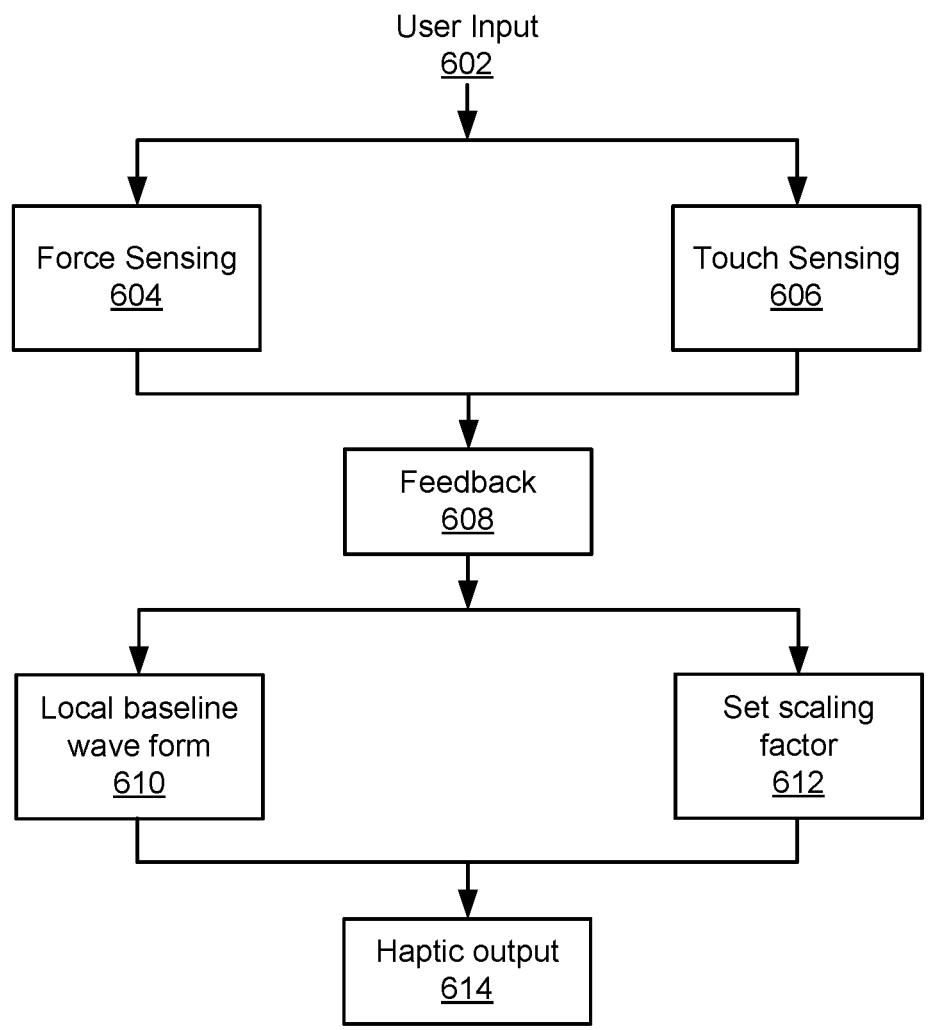
FIG. 6 shows an example of a process.

FIG. 6 shows an example of a process 600. The process 600 may be used in combination with one or more other examples described elsewhere herein. The process 600 may be performed using one or more examples described with reference to FIG. 11. More or fewer operations may be performed. Two or more operations may be performed in a different order unless otherwise indicated.

At 602, a user input may be made. For example, the user makes an input using the front surface 104 in FIG. 2.

At 604, force sensing based on the user input may be performed. For example, the force sensing component 406 in FIG. 4 may sense one or more characteristics relating to the force(s) applied in the user input.

At 606, touch sensing based on the user input may be performed. For example, the touch sensing component 402 in FIG. 4 may sense one or more characteristics relating to the touch(es) applied in the user input.

At 608, one or more aspects of feedback may be determined. The feedback may be determined based on the force sensing at 604 and/or the touch sensing at 606. This may involve one or more examples described with reference to the sensing input component 518 in FIG. 4. For example, a driver signal waveform may be selected at 608. As another example, scaling of a driver signal waveform may be determined at 608.

At 610, a baseline waveform may be loaded. In some implementations, the baseline waveform may be loaded based on the selection of a driver signal waveform at 608. For example, the baseline waveform may be one of the driver signal waveforms 414 in FIG. 4.

At 612, a scaling factor for the baseline waveform may be set. In some implementations, the scaling factor may be set based on the determined scaling of a driver signal waveform at 608.

At 614, haptic output may be generated. In some implementations, the haptic output corresponds to a modification of the baseline waveform loaded at 610 according to the scaling set at 612. For example, the actuator sub-system 416 in FIG. 4 may generate the haptic output.

FIGS. 7A-E show examples relating to haptic output being controlled using a force signal and/or a sense signal. The examples may be used in combination with one or more other examples described elsewhere herein. The examples may be performed using one or more examples described with reference to FIG. 11. Some of the examples involve a trackpad surface 700 (e.g., the front surface 104 in FIG. 2).

Figure 7A:
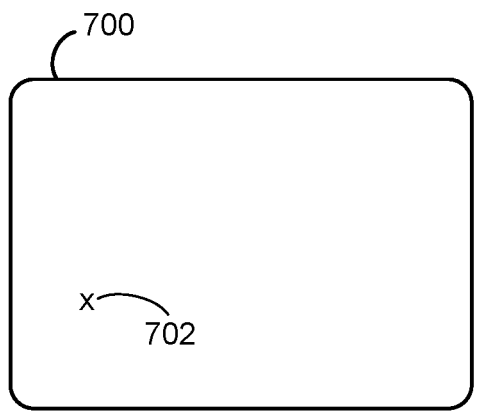
FIGS. 7A-E show examples relating to haptic output being controlled using a force signal and/or a sense signal.

In FIG. 7A, a location 702 on the trackpad surface 700 is schematically indicated. The location 702 may correspond to a user input made by a user's hand (e.g., a fingertip thereof) and/or a stylus, to name just two examples. The location 702 may affect one or more aspects of haptic output. In some implementations, the location 702 may be the basis for the localization 520 in FIG. 5. For example, a touch signal may reflect the location 702 on the trackpad surface 700 and a scaling of a driver signal waveform may depend on the location 702.

Figure 7B:
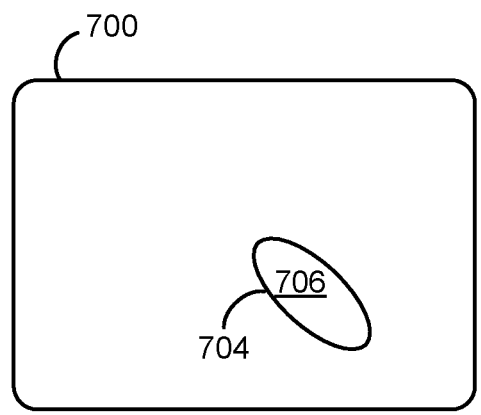

In FIG. 7B, a contact 704 on the trackpad surface 700 having an area 706 is schematically illustrated. The contact 704 may be made by a user's hand (e.g., a fingertip thereof) and/or a stylus, to name just two examples. The contact 704 and/or the area 706 may affect one or more aspects of haptic output. In some implementations, the contact 704 may be the basis for the contact area 522 in FIG. 5. For example, a touch signal may reflect a size of the area 706 involved in the user input.

Figure 7C:
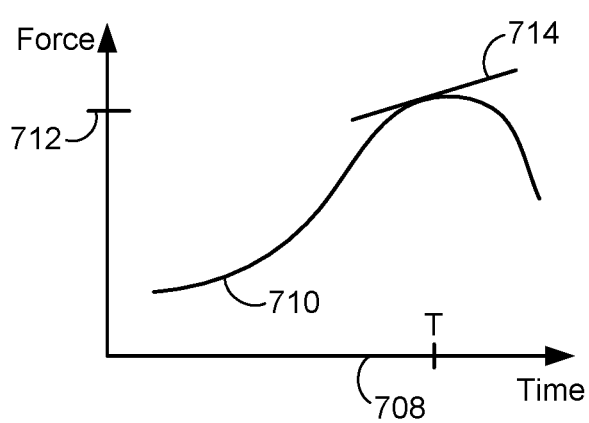

In FIG. 7C, a diagram 708 has force indicated relative to a vertical axis and time indicated relative to a horizontal axis. A graph 710 indicates how detected force varies over a time interval. For example, this may be the force detected while the user make the medium force input 504 and/or the heavy force input 506 in FIG. 5. Generation of haptic output may be conditioned on at least one threshold 712. For example, the force corresponding to the graph 710 does not trigger any haptic output until and unless the force reaches the threshold 712. In some implementations, the selection, scaling, and generation of the haptic output (e.g., at 608-614 in FIG. 6) may be conditioned on determining that a force signal corresponding to the detected force meets the threshold 712.

A rate of change 714 may be determined for the graph 710 for any or all times T (e.g., as indicated in the diagram 708) and is here schematically illustrated as a tangent line. The rate of change 714 may correspond to the instantaneous or near-instantaneous change (e.g., increase or decrease) in the force at the time T and may be represented by the slope of the tangent line. In some implementations, the selection, scaling, and generation of the haptic output (e.g., at 608-614 in FIG. 6) may depend on the rate of change 714.

Figure 7D:
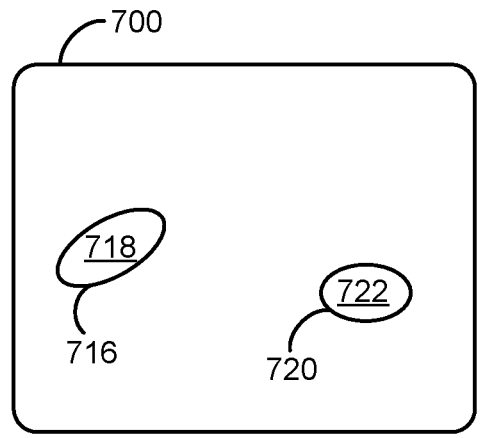

In FIG. 7D, a contact 716 on the trackpad surface 700 having an area 718, and a contact 720 having an area 722, are schematically illustrated. The contacts 716 and 720 may be made by a user's hand (e.g., fingertips thereof) and/or styluses, to name just a few examples. The contacts 716 and 720 and/or the areas 718 and 722 may affect one or more aspects of haptic output. For example, the total size of the areas 718 and 722 may be considered as the area of the user input. In some implementations, a touch signal reflects the contacts 716 and 720 as multiple simultaneous contacts at the trackpad surface 700. This may allow a system (e.g., the computer system 400 in FIG. 4) to decouple a force (e.g., corresponding to the graph 710 in FIG. 7C) represented by the force signal relative to the multiple simultaneous contacts. For example, assume that the system determines that the total force corresponds to the weight of 200 grams of mass. The decoupling may then involve determining a mass m the weight of which represents the force received at the contact 716, and a mass 200-$m$ the weight of which represents the force received at the contact 720. The haptic output may then depend at least in part on the respective masses m and 200-$m$ (or other parameters reflecting force).

Figure 7E:
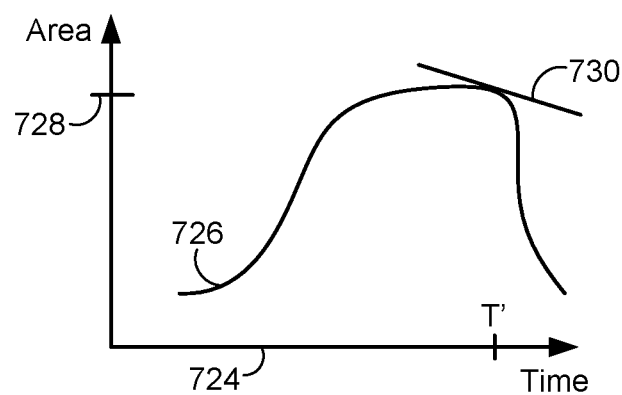

In FIG. 7E, a diagram 724 has area indicated relative to a vertical axis and time indicated relative to a horizontal axis. A graph 726 indicates how detected area varies over a time interval. For example, this may be the area 706 of the contact 704 in FIG. 7B, or the areas 718 and 722 in FIG. 7D. Generation of haptic output may be conditioned on a threshold. In some implementations, the threshold may relate to force (e.g., as with the threshold 712 in FIG. 7C). In some implementations, an area 728 for the haptic output may be determined based on when the (force) threshold is reached. For example, the area(s) detected before and/or after the (force) threshold is reached may not be taken into account in applying the haptic output.

A rate of change 730 may be determined for the graph 726 for any or all times T' (e.g., as indicated in the diagram 724) and is here schematically illustrated as a tangent line. The time T' may be the same time as, or a different time than, the time T in FIG. 7C. The rate of change 730 may correspond to the instantaneous or near-instantaneous change (e.g., increase or decrease) in the area at the time T' and may be represented by the slope of the tangent line. In some implementations, the selection, scaling, and generation of the haptic output (e.g., at 608-614 in FIG. 6) may depend on the rate of change 730. When the haptic output involves scaling of a driver signal waveform, such scaling may increase with diminishing size of the area, and may decrease with increasing size of the area. For example, the scaling may be inversely proportional to the area. The scaling may apply to at least an amplitude of the driver signal waveform. Other relationships between area and scaling may be used.

Figure 8:
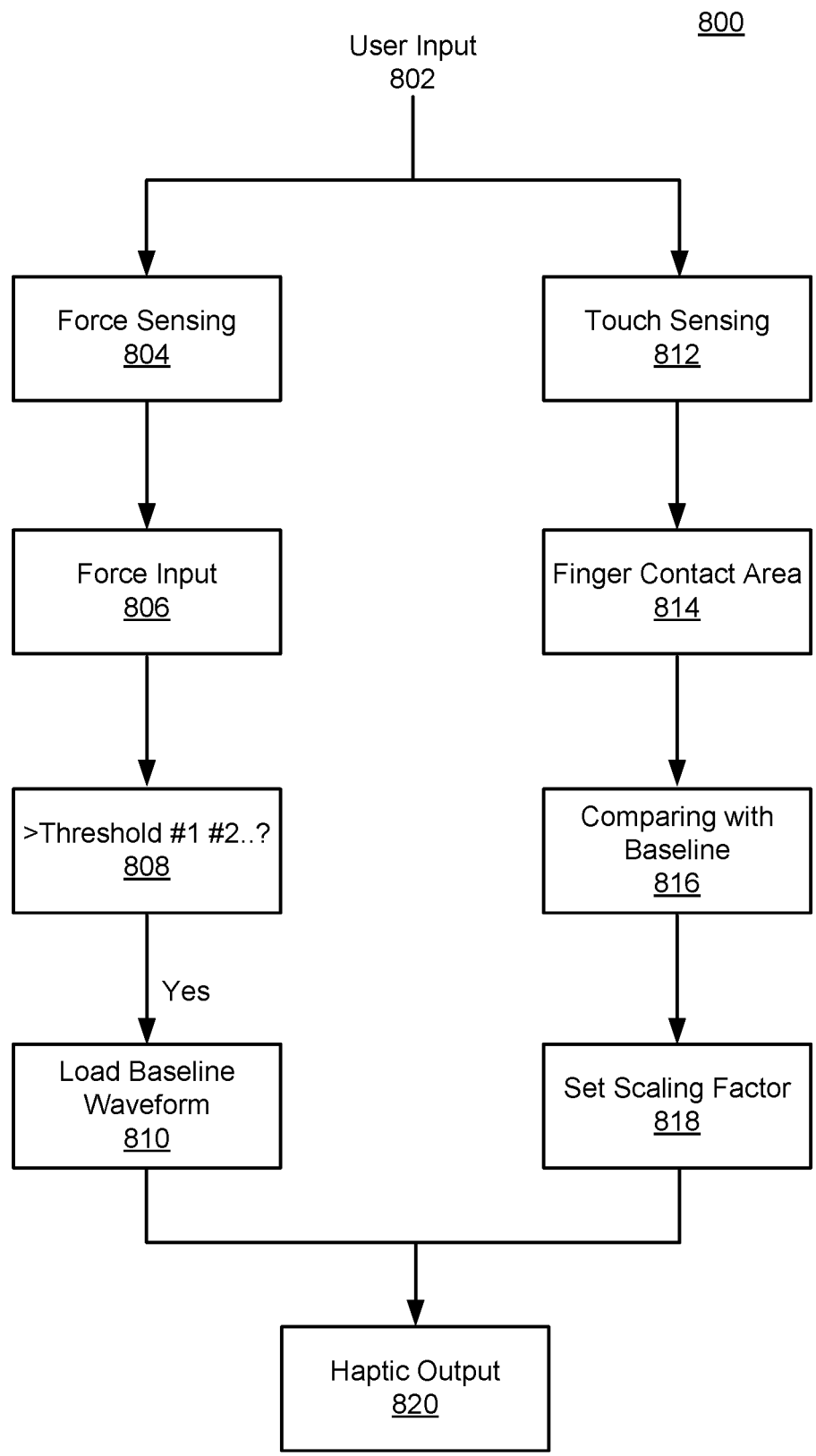
FIG. 8 shows another example of a process.

FIG. 8 shows another example of a process 800. The process 800 may be used in combination with one or more other examples described elsewhere herein. The process 800 may be performed using one or more examples described with reference to FIG. 11. More or fewer operations may be performed. Two or more operations may be performed in a different order unless otherwise indicated.

At 802, a user input may be made. For example, the user makes an input using the front surface 104 in FIG. 2.

At 804, force sensing based on the user input may be performed. For example, the force sensing component 406 in FIG. 4 may sense one or more characteristics relating to the force(s) applied in the user input.

At 806, at least one force input may be determined based on the force sensing. In some implementations, this involves generating a force signal that reflects the detected force(s). For example, the force sensing component 406 in FIG. 4 may determine the force input.

At 808, a threshold evaluation may be performed. In some implementations, one or more aspects of the determined force input may be evaluated against at least one threshold. The evaluation may be done in size order, such as in increasing or decreasing order of the magnitude or size of the thresholds. For example, if the aspect(s) do not meet threshold #1, then a different threshold #2 may be evaluated, and so on. If the aspect(s) meet a threshold during the evaluation, this can be the basis for selection of a driver signal waveform. For example, each of the driver signal waveforms 414 in FIG. 4 may be associated with a respective one of the force thresholds. Accordingly, when the aspect(s) of the determined force input meets the threshold, the corresponding driver signal waveform may be selected.

At 810, a baseline waveform may be loaded. The waveform may be referred to as "baseline" due to the possibility of modifying or adjusting the waveform (e.g., by scaling) in another operation of the process 800. For example, the baseline waveform may be a default choice that is predefined. As another example, the user may be able to choose the baseline waveform from among multiple alternatives, or edit an existing waveform to generate the baseline waveform. In some implementations, the baseline waveform may be loaded based on a selection of a driver signal waveform at 808. For example, the baseline waveform may be one of the driver signal waveforms 414 in FIG. 4.

At 812, touch sensing based on the user input may be performed. For example, the touch sensing component 402 in FIG. 4 may sense one or more characteristics relating to the touch(es) applied in the user input.

At 814, a contact area (e.g., a finger contact area) may be determined. In some implementations, the sensing input component 518 in FIG. 5 may determine the contact area 522. For example, this may be the area 706 of the contact 704 in FIG. 7B, or the areas 718 and 722 in FIG. 7D.

At 816, the contact area(s) may be compared with a baseline area size. The size of the area may be referred to as "baseline" due to the possibility of using the outcome of the comparison in modifying or adjusting the waveform (e.g., by scaling) in another operation of the process 800. For example, the contact area(s) may be greater or smaller than the baseline area size.

At 818, a scaling factor for the baseline waveform may be set. In some implementations, the scaling factor may be set based on the comparison with a baseline at 816. For example, the scaling may involve at least one of altering an amplitude of the baseline waveform or altering a duration of the baseline waveform.

At 820, haptic output may be generated. In some implementations, the haptic output corresponds to a modification of the baseline waveform loaded at 810 according to the scaling set at 818. For example, the actuator sub-system 416 in FIG. 4 may generate the haptic output.

FIGS. 9A-D show examples of driver signal waveforms. The examples may be used in combination with one or more other examples described elsewhere herein. The examples may be performed using one or more examples described with reference to FIG. 11.

Figure 9A:
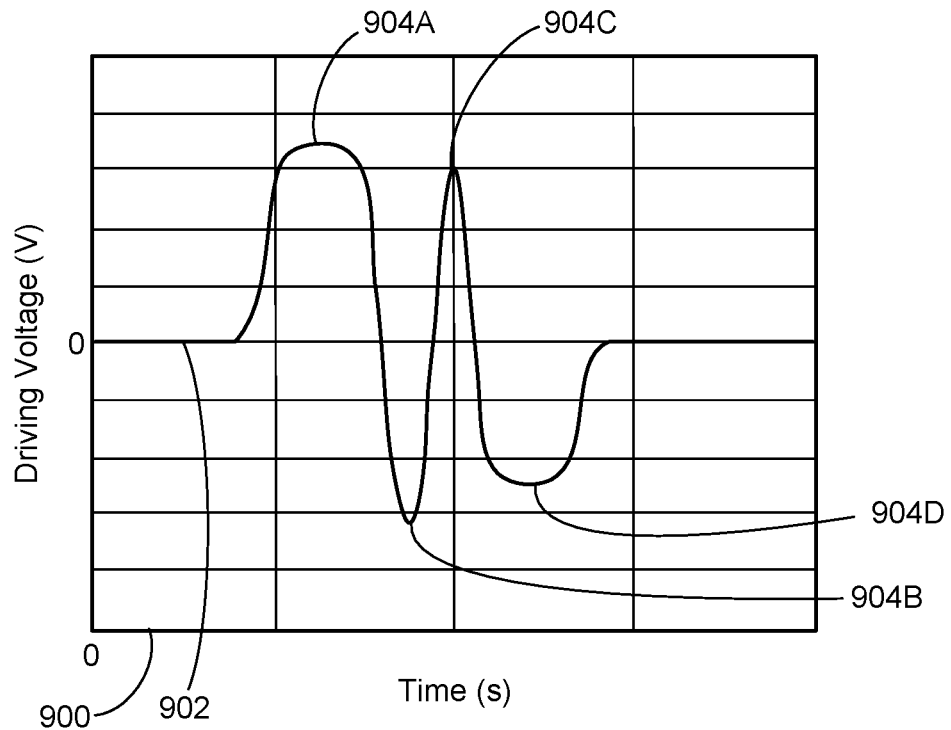
FIGS. 9A-D show examples of driver signal waveforms.

A diagram 900 has driving voltage (e.g., in units of volts, V) indicated relative to a vertical axis and time (e.g., in units of seconds) indicated relative to a horizontal axis. In FIG. 9A, a graph 902 indicates how the driver signal varies over a time interval. The graph 902 may correspond to a baseline waveform. For example, this may be a waveform that is optionally to be scaled before generating haptic output. The graph 902 indicates that the driver signal waveform has an initial voltage (e.g., on the order of zero V), and thereafter reaches a local extremum 904A (here, a local maximum), a local extremum 904B (here, a local minimum), a local extremum 904C (here, a local maximum), and a local extremum 904D (here, a local minimum), before returning to approximately the initial voltage. Application of the driver signal waveform corresponding to the graph 902 to an actuator (e.g., the actuator 418 in FIG. 4) causes haptic output to be generated.

Figure 9B:
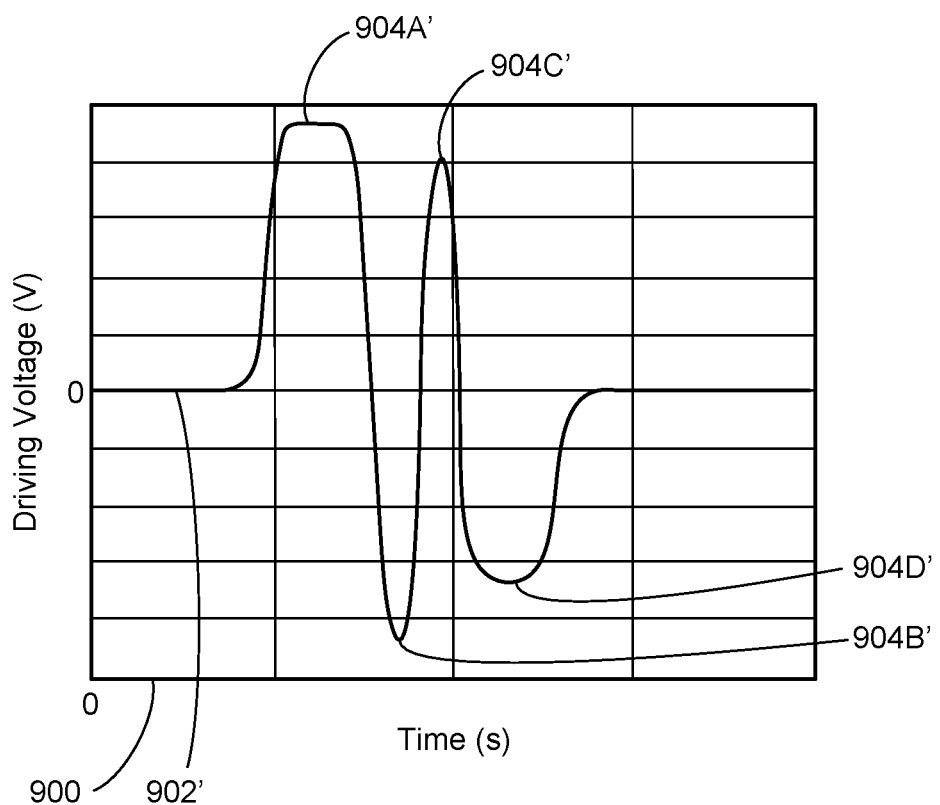

One or more modified driver signal waveforms may be generated. In FIG. 9B, a graph 902' corresponds to altering at least the amplitude of the graph 902 in FIG. 9A. For example, local extrema 904A'-D' are seen to have a greater magnitude from the corresponding ones of the local extrema 904A-D. In some implementations, the amplitude may instead or also be decreased.

Figure 9C:
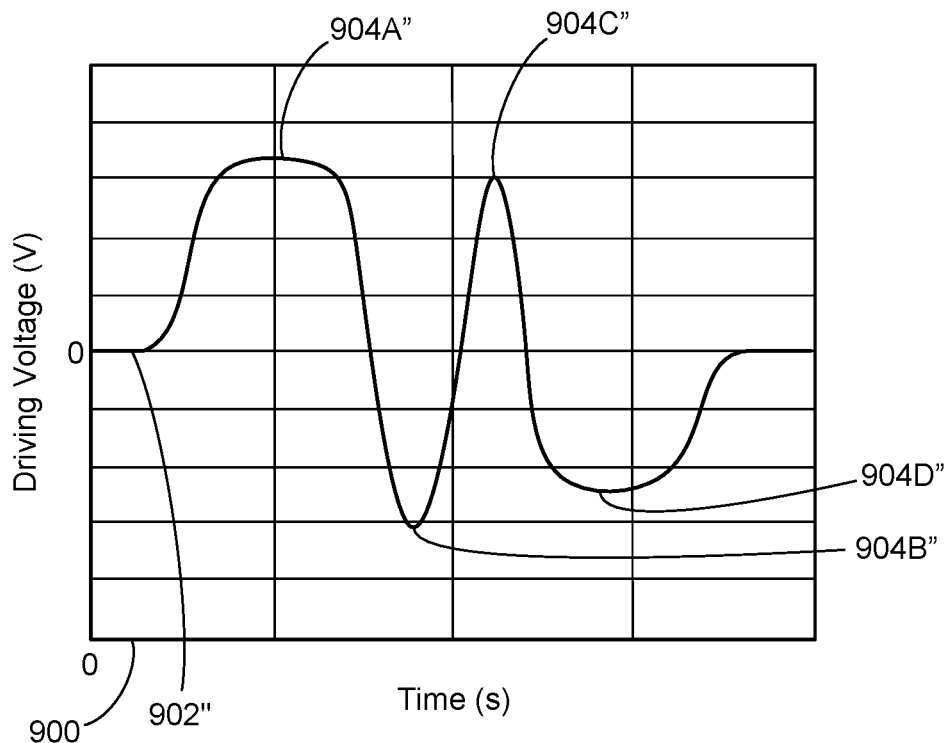

In FIG. 9C, a graph 902" corresponds to altering at least a duration of the graph 902 in FIG. 9A. For example, local extrema 904A"-D" are seen to have longer durations, and occur at somewhat different times, than the corresponding ones of the local extrema 904A-D. In some implementations, the duration may instead or also be decreased.

Figure 9D:
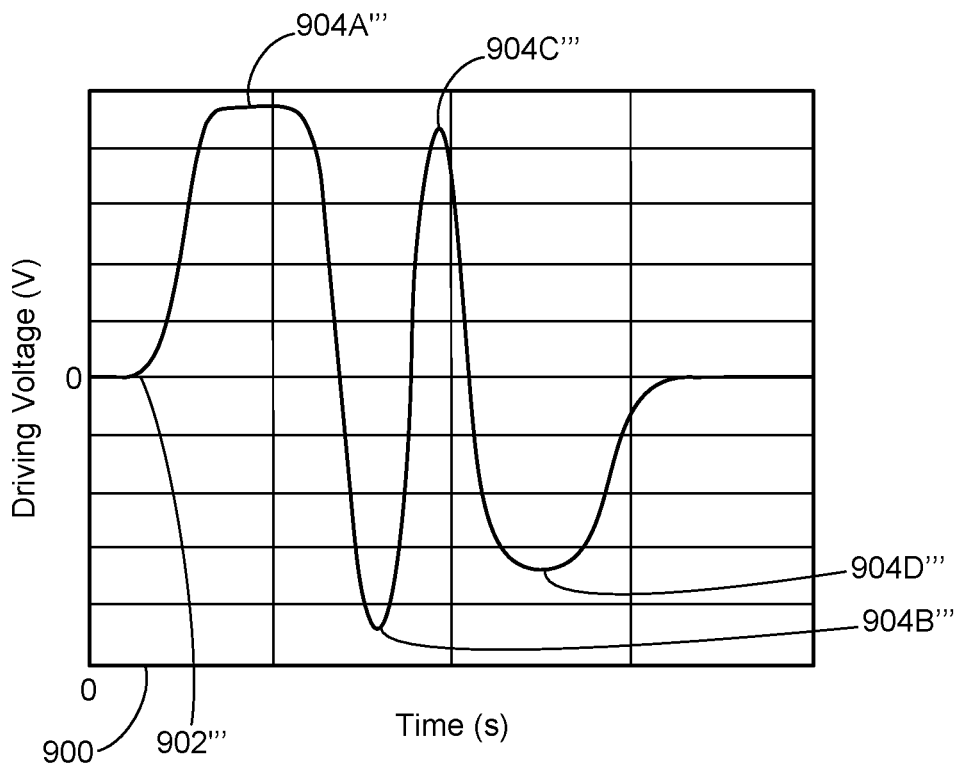

In FIG. 9D, a graph 902''' corresponds to altering at least an amplitude and a duration of the graph 902 in FIG. 9A. For example, local extrema 904A'''-D''' are seen to have a greater magnitude, have longer durations, and occur at somewhat different times, than the corresponding ones of the local extrema 904A-D. In some implementations, the amplitude and/or duration may instead or also be decreased.

Figure 10:
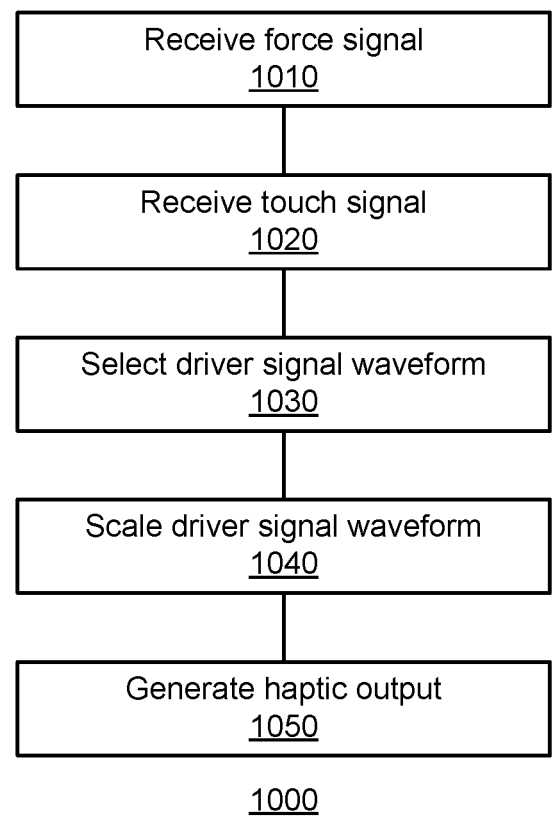
FIG. 10 shows an example of a method.

FIG. 10 shows an example of a method 1000. The method 1000 may be used in combination with one or more other examples described elsewhere herein. The method 1000 may be performed using one or more examples described with reference to FIG. 11. More or fewer operations may be performed. Two or more operations may be performed in a different order unless otherwise indicated.

At 1010, the method includes receiving, in an electronic device having a trackpad (e.g., the trackpad 100 in FIG. 1), a force signal (e.g., the signal 408) that a force sensor (e.g., of the force sensing component 406) of the trackpad generates based on a user input at the trackpad.

At 1020, the method includes receiving, in the electronic device, a touch signal (e.g., the signal 404) that a touch sensor (e.g., of the touch sensing component 402) of the trackpad generates based on the user input.

At 1030, the method includes selecting, by the electronic device and based on at least one of the force signal or the touch signal, a first driver signal waveform from among multiple driver signal waveforms (e.g., the driver signal waveforms 414) applicable to an actuator (e.g., the actuator 418) coupled to the trackpad.

At 1040, the method includes scaling, by the electronic device, the first driver signal waveform into a second driver signal waveform (e.g., the signal 426), the scaling based on at least one of the force signal or the touch signal.

At 1050, the method includes generating, by the electronic device, a haptic output (e.g., by the actuator subsystem 416) in response to the user input by providing the second driver signal waveform to the actuator.

Figure 11:
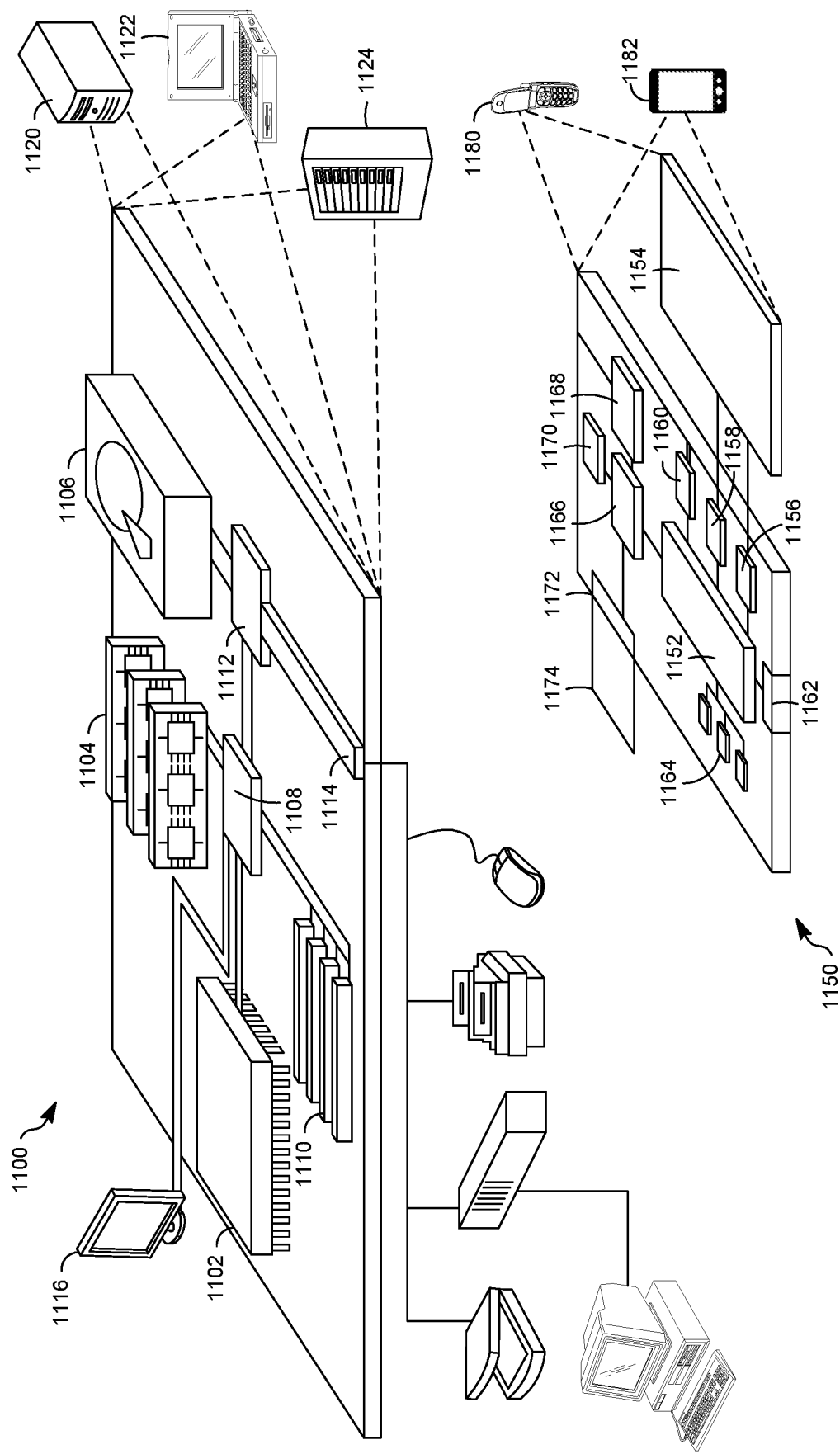
FIG. 11 shows an example of a computer device and a mobile computer device that can be used to implement the techniques described here.

FIG. 11 shows an example of a generic computer device 1100 and a generic mobile computer device 1150, which may be used with the techniques described here. Computing device 1100 is intended to represent various forms of digital computers, such as laptops, desktops, tablets, workstations, personal digital assistants, televisions, servers, blade servers, mainframes, and other appropriate computing devices. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. The processor 1102 can be a semiconductor-based processor. The memory 1104 can be a semiconductor-based memory. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provided in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provided as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

In the following some examples are described.

Example 1: A method comprising:

receiving, in an electronic device having a trackpad, a force signal that a force sensor of the trackpad generates based on a user input at the trackpad;

receiving, in the electronic device, a touch signal that a touch sensor of the trackpad generates based on the user input;

selecting, by the electronic device and based on at least one of the force signal or the touch signal, a first driver signal waveform from among multiple driver signal waveforms applicable to an actuator coupled to the trackpad;

scaling, by the electronic device, the first driver signal waveform into a second driver signal waveform, the scaling based on at least one of the force signal or the touch signal; and generating, by the electronic device, a haptic output in response to the user input by providing the second driver signal waveform to the actuator.

Example 2: The method of example 1, wherein scaling the first driver signal waveform comprises at least one of altering an amplitude of the first driver signal waveform and/or altering a duration of the first driver signal waveform.

Example 3: The method of example 1 or 2, wherein the selection, scaling, and generation of the haptic output are conditioned on determining that the force signal meets a force threshold.

Example 4: The method of at least one of the preceding examples, wherein the touch signal reflects a location of the user input on the trackpad and wherein the scaling depends on the location.

Example 5: The method of at least one of the preceding examples, wherein the touch signal reflects a size of an area of the touchpad involved in the user input.

Example 6: The method of example 5, further comprising comparing the size of the area with a baseline area size, wherein the scaling is based at least in part on the comparison.

Example 7: The method of example 5 or 6, wherein the scaling increases with diminishing size of the area, and wherein the scaling decreases with increasing size of the area.

Example 8: The method of example 7, wherein the increase and decrease are of at least an amplitude of the first driver signal waveform.

Example 9: The method of at least one of the examples 5 to 8, further comprising determining a change in the size of the area during the user input, wherein the scaling is based at least in part on the determination.

Example 10: The method of at least one of the examples 5 to 9, wherein the selection, scaling, and generation of the haptic output are conditioned on determining that the force signal meets a force threshold, the method further comprising determining the size of the area as the force signal meets the threshold.

Example 11: The method of at least one of the examples 5 to 10, wherein the touch signal reflects multiple simultaneous contacts at the trackpad.

Example 12: The method of example 11, further comprising decoupling a force represented by the force signal relative to the multiple simultaneous contacts.

Example 13: The method of example 11 or 12, wherein the size of the area corresponds to a total area of the multiple simultaneous contacts.

Example 14: The method of at least one of the examples 5 to 13, further comprising determining a rate of change of the size of the area using the touch signal, wherein at least one of the selection and the scaling is based at least in part on the rate of change of the size of the area.

Example 15: The method of at least one of the preceding examples, wherein the force signal reflects a force of the user input, the method further comprising determining a rate of change of the force using the force signal, wherein at least one of the selection and the scaling is based at least in part on the rate of change of the force.

Example 16: The method of at least one of the preceding examples, wherein the multiple driver signal waveforms are associated with respective force thresholds, and wherein selecting the first driver signal waveform comprises evaluating the force signal relative to the force thresholds in size order.

Example 17: The method of at least one of the preceding examples, wherein the actuator is operating according to one or more axes, in particular the actuator is a multi-axis actuator or a single-axis actuator Example 18: A non-transitory storage medium having stored therein instructions that when executed by a processor cause the processor to perform operations comprising:

receiving, in an electronic device having a trackpad, a force signal that a force sensor of the trackpad generates based on a user input at the trackpad;

receiving, in the electronic device, a touch signal that a touch sensor of the trackpad generates based on the user input;

selecting, by the electronic device and based on at least one of the force signal or the touch signal, a first driver signal waveform from among multiple driver signal waveforms applicable to an actuator coupled to the trackpad;

scaling, by the electronic device, the first driver signal waveform into a second driver signal waveform, the scaling based on at least one of the force signal or the touch signal; and generating, by the electronic device, a haptic output in response to the user input by providing the second driver signal waveform to the actuator.

Example 19: A system comprising:
a processor;
a memory;
an enclosure;
a trackpad coupled to the enclosure;
an actuator coupled to the trackpad and configured to generate haptic output;
a force sensor coupled to the trackpad and configured to generate a force signal based on a user input at the trackpad;
a touch sensor coupled to the trackpad and configured to generate a touch signal based on the user input; and
a microcontroller configured to select, based on at least one of the force signal or the touch signal, a first driver signal waveform from among multiple driver signal waveforms applicable to the actuator, scale the first driver signal waveform into a second driver signal waveform based on at least one of the force signal or the touch signal, and provide the second driver signal waveform to the actuator to generate the haptic output in response to the user input.

Example 20: The system of example 19, wherein the microcontroller is further configured to determine a rate of change over time for at least one of the force signal or the sense signal.

Example 21: The system of example 19 or 20, wherein the multiple driver signal waveforms are associated with respective force thresholds, and wherein the microcontroller is further configured to evaluate the force signal relative to the force thresholds in size order.

What is claimed is:

1. A method comprising:
   receiving, in an electronic device having a trackpad, a force signal that a force sensor of the trackpad generates based on a user input at the trackpad;
   receiving, in the electronic device, a touch signal that a touch sensor of the trackpad generates based on the user input, wherein the touch signal reflects a size of an area of the trackpad involved in the user input;
   comparing, by the electronic device, the size of the area with a baseline area size;
   selecting, by the electronic device and based on at least one of the force signal or the touch signal, a first driver signal waveform from among multiple driver signal waveforms applicable to an actuator coupled to the trackpad;
   scaling, by the electronic device, the first driver signal waveform into a second driver signal waveform, the scaling based at least in part on the comparison; and
   generating, by the electronic device, a haptic output in response to the user input by providing the second driver signal waveform to the actuator.

2. The method of claim 1, wherein scaling the first driver signal waveform comprises at least one of altering an amplitude of the first driver signal waveform or altering a duration of the first driver signal waveform.

3. The method of claim 1, wherein at least the selection, scaling, and generation of the haptic output are conditioned on determining that the force signal meets a force threshold.

4. The method of claim 1, wherein the touch signal reflects a location of the user input on the trackpad and wherein the scaling also depends on the location, wherein the haptic output differs depending on the location.

5. The method of claim 1, wherein the scaling increases with diminishing size of the area, and wherein the scaling decreases with increasing size of the area.

6. The method of claim 5, wherein the increase and decrease are of at least an amplitude of the first driver signal waveform.

7. The method of claim 1, further comprising determining a change in the size of the area during the user input, wherein the scaling is based also at least in part on the determination.

8. The method of claim 3, wherein the size of the area is determined as the force signal meets the threshold.

9. The method of claim 1, wherein the touch signal reflects multiple simultaneous contacts at the trackpad.

10. The method of claim 9, further comprising decoupling a force represented by the force signal relative to the multiple simultaneous contacts.

11. The method of claim 9, wherein the size of the area corresponds to a total area of the multiple simultaneous contacts.

12. The method of claim 1, further comprising determining a rate of change of the size of the area using the touch signal, wherein at least one of the selection and the scaling is based at least in part on the rate of change of the size of the area.

13. The method of claim 1, wherein the force signal reflects a force of the user input, the method further comprising determining a rate of change of the force using the force signal, wherein at least one of the selection and the scaling is based at least in part on the rate of change of the force.

14. The method of claim 1, wherein the multiple driver signal waveforms are associated with respective force thresholds, and wherein selecting the first driver signal waveform comprises evaluating the force signal relative to the force thresholds in size order.

15. The method of claim 1, wherein the actuator is operating according to one or more axes, and wherein the actuator is a multi-axis actuator or a single-axis actuator.

16. The method of claim 1, wherein the first driver signal waveform includes an initial voltage, and a first local extremum occurring after the initial voltage, wherein the first driver signal waveform returns to the initial voltage after the first local extremum, wherein the second driver signal waveform changes the first local extremum to a second local extremum, wherein the second local extremum has a longer duration than the first local extremum, and wherein the second local extremum occurs at a different time within the second driver signal waveform than the first local extremum occurs within the first driver signal waveform.

17. The method of claim 1, wherein the first driver signal waveform includes an initial voltage, and a first local extremum occurring after the initial voltage, wherein the first driver signal waveform returns to the initial voltage after the first local extremum, wherein the second driver signal waveform changes the first local extremum to a second local extremum, wherein the second local extremum has a shorter duration than the first local extremum, and wherein the second local extremum occurs at a different time within the second driver signal waveform than the first local extremum occurs within the first driver signal waveform.

18. A non-transitory storage medium having stored therein instructions that when executed by a processor cause the processor to perform operations comprising:
receiving, in an electronic device having a trackpad, a force signal that a force sensor of the trackpad generates based on a user input at the trackpad;
receiving, in the electronic device, a touch signal that a touch sensor of the trackpad generates based on the user input, wherein the touch signal reflects a location of the user input on the trackpad;
selecting, by the electronic device and based on at least one of the force signal or the touch signal, a first driver signal waveform from among multiple driver signal waveforms applicable to an actuator coupled to the trackpad;
scaling, by the electronic device, the first driver signal waveform into a second driver signal waveform, the scaling based at least in part on the location; and
generating, by the electronic device, a haptic output in response to the user input by providing the second driver signal waveform to the actuator, wherein the haptic output differs depending on the location.

19. A system comprising:
a processor;
a memory;
an enclosure;
a trackpad coupled to the enclosure;
an actuator coupled to the trackpad and configured to generate haptic output;
a force sensor coupled to the trackpad and configured to generate a force signal based on a user input at the trackpad, wherein the force signal reflects a force of the user input;
a touch sensor coupled to the trackpad and configured to generate a touch signal based on the user input; and
a microcontroller configured to select, based on at least one of the force signal or the touch signal, a first driver signal waveform from among multiple driver signal waveforms applicable to the actuator, scale the first driver signal waveform into a second driver signal waveform based on at least the force signal, determine a rate of change of the force using the force signal, wherein at least one of the selection or the scaling is based at least in part on the rate of change of the force, and provide the second driver signal waveform to the actuator to generate the haptic output in response to the user input.

20. The system of claim 19, wherein the microcontroller is further configured to determine a rate of change over time for at least one of the force signal or the touch signal.

21. The system of claim 19, wherein the multiple driver signal waveforms are associated with respective force thresholds, and wherein the microcontroller is further configured to evaluate the force signal relative to the force thresholds in size order.

* * * * *